May 1, 1956 — C. L. NASH — 2,743,938
OUTBOARD MOTOR TRUCK
Filed Sept. 21, 1953
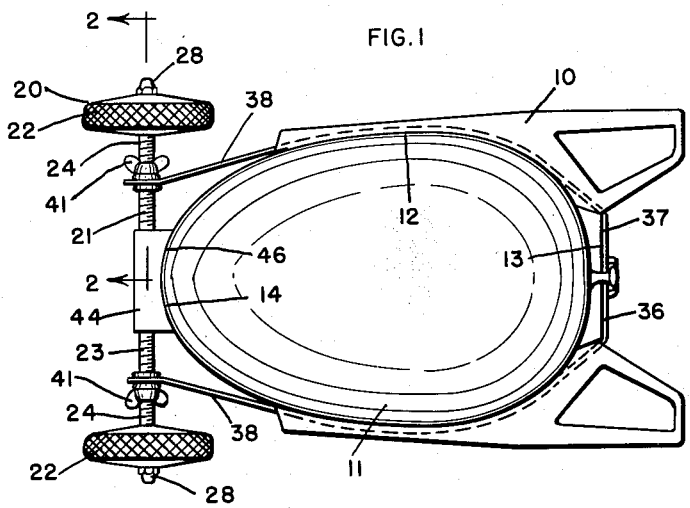
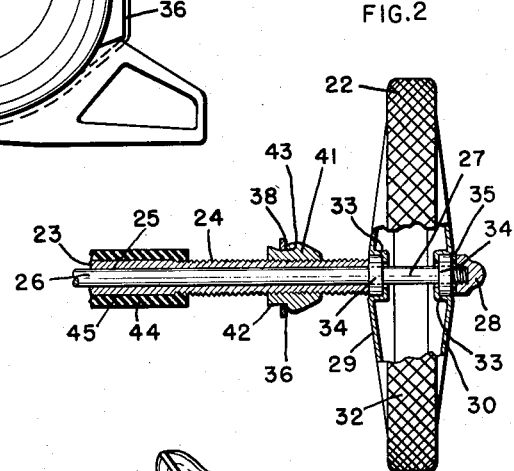
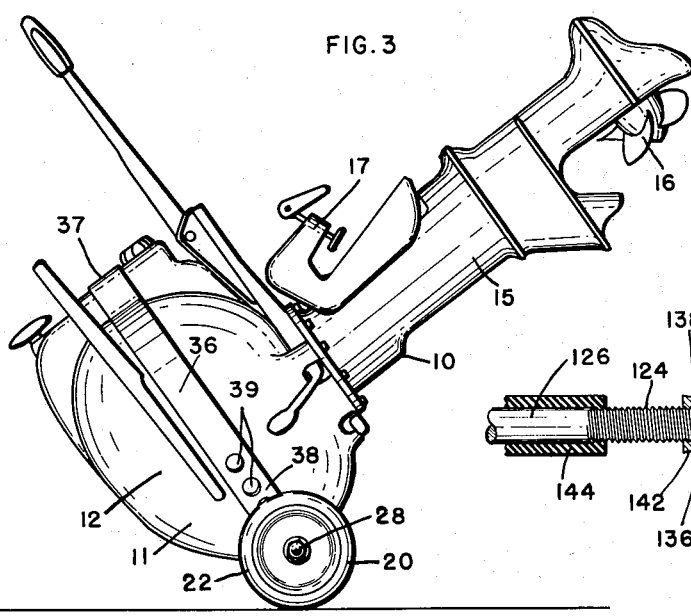
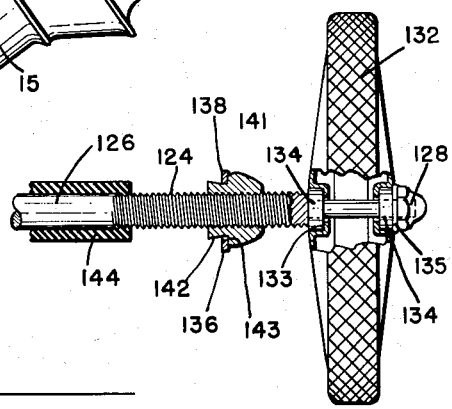
CLIFFORD L. NASH INVENTOR.
Caswell & Lagaard ATTORNEYS.

United States Patent Office 2,743,938
Patented May 1, 1956

2,743,938
OUTBOARD MOTOR TRUCK

Clifford L. Nash, St. Paul, Minn.

Application September 21, 1953, Serial No. 381,358

5 Claims. (Cl. 280—47.13)

The herein disclosed invention relates to trucks for outboard motors and has for an object to provide a truck which can be easily and readily applied to different types, styles and sizes of outboard motors and by means of which the motor may be conveniently moved about without being carried.

Another object of the invention resides in providing a truck which will be sufficiently light and which will be sufficiently inconspicuous so that the same may be left on the outboard motor at all times.

A still further object of the invention resides in providing a truck capable of being attached to the body of the outboard motor without alteration or reconstruction thereof.

A feature of the invention resides in providing a strap extending about the body of the outboard motor and having holes in the sides of the same and through which an axle carrying supporting wheels extends.

Another object of the invention resides in constructing the axle with a threaded tubular axle housing having nuts screwed thereon and engaging the ends of the band and urging the same together and in further providing a thrust member acting between the axle housing and said body and serving upon screwing of the nuts against the ends of the band to rigidly clamp the truck to the outboard motor.

A still further object of the invention resides in utilizing an axle shaft extending through said axle housing and on which the supporting wheels are mounted.

Other objects of the invention reside in the details of construction hereinafter illustrated and/or described.

In the drawings:

Fig. 1 is a plan view of an outboard motor illustrating an embodiment of the invention applied thereto.

Fig. 2 is a fragmentary elevational sectional view taken on line 2—2 of Fig. 1 and drawn to a greater scale.

Fig. 3 is a side elevational view of the structure illustrated in Fig. 1 showing the motor inverted and with the truck wheels in engagement with the ground.

Fig. 4 is a view similar to Fig. 2 of a modification of the invention.

The construction illustrated in the drawings includes a conventional type of outboard motor having a body in which the engine is disposed and a crank shaft housing depending therefrom and rotatably supporting the crank shaft. A propeller mounted for rotation at the end of said housing is operated from the crank shaft of the engine. The invention proper comprises an axle on which are disposed rotatable spaced supporting wheels. This axle comprises a tubular axle housing threaded at its ends and which passes through openings in the ends of a band encircling the body of the motor. A thrust member is disposed between this axle housing and the body and nuts screwed on the threads of the axle housing engage the ends of the bands and draw the same together to clamp the truck to the body of the motor. An axle shaft extends through the axle housing and has mounted on the ends of the same the supporting wheels.

For the purpose of illustrating the invention a conventional form of outboard motor 10 has been shown in the drawings. Such construction being well known in the art, the motor has not been shown in detail in the drawings, and it will be readily comprehended that any type of motor may be used. The motor shown comprises a body 11 which encloses the motor proper and which is ovular in form as best shown in Fig. 1. This body is of greatest dimensions midway of its height and has a flattened portion 12 extending about the same at such locality. This flattened portion has a front end 13 and a rear end 14. Issuing downwardly from the body 11 is a crank shaft housing 15 in which the crank shaft of the motor is disposed. A propeller 16 disposed at the lower end of the housing 15 is driven from the crank shaft of the motor in the housing 15. A clamp 17 serves to attach the outboard motor to the transom of the boat on which it is to be used.

The truck forming the subject matter of the instant invention is designated in its entirety by the reference numeral 20 and consists of an axle 21 on which are mounted supporting wheels 22. The axle 21 comprises an axle housing 23, tubular in form, which is provided with threads 24 at its ends and which has a bore 25 extending through the same. In this bore is received an axle shaft 26 and which has end extensions 27 projecting outwardly beyond the end of the housing 23. These extensions are threaded at their ends to receive acorn nuts 28.

The wheels 22 may be of standard construction and the form shown comprises two flaring sheet metal wheel centers 29 and 30. These wheel centers support a rubber tire 32 and are provided with sockets 33 in which ball bearings 34 are received. The axle shaft extensions 27 pass through these ball bearings, and washers 35 disposed one on each side of each of the wheels hold the wheels properly assembled for rotation. While the wheels are shown as having ball bearings, it can readily be comprehended that sleeve bearings may be employed and that the wheels may be tight on the axle shaft and the entire axle shaft and wheels rotated as a unit.

For the purpose of attachment of the axle 21 to the motor 10, a band of metal 36 is employed which is thin enough so that the same may be readily bent by hand. The intermediate part 37 of this band is wrapped about the flattened portion 12 of the body 11 of motor 10 with the ends 38 projecting outwardly beyond the rear end 14 of said flattened portion. The ends 38 of this band have a series of closely spaced holes 39 therein and through which the axle 21 extends.

Screwed upon the threads 24 of axle housing 23 are two nuts 41. These nuts have reduced portions 42 which freely pass through the holes 39 in the ends 38 of band 36. This construction provides shoulders 43 which butt up against the ends 38 of the band and draw the same together as the nuts 41 are screwed inwardly.

Mounted on the axle housing 23 at the middle of the same is a thrust member 44. This member is in the form of a block and is constructed of rubber or some other suitable flexible material. The thrust member 44 has a bore 45 extending through the same and which receives the axle housing 23. The said thrust member is also formed with a concavity 46 which forms a socket in which the rear end 14 of the flattened portion 12 of motor body 11 is received. This thrust member prevents injury to the surface of the motor.

The manner of using the invention is manifest. The thrust member 44 is first strung on the axle housing 23. The band 36 is next wrapped about the flattened portion 12 of the body 11 and shifted so that the holes 39 in one of the ends lie opposite the holes in the other end. The axle housing 23 with the thrust member 44 applied is inserted in the holes 39 which lie nearest the end 14 of the flattened portion 12 of body 11 and the end 14 brought into the socket 46 in thrust member 44. Nuts 41 are next applied to the threads 24 when the reduced portions 42 extending inwardly and screwed toward each other. When sufficiently advanced, the reduced portions 42 enter the holes 39 through which the axle housing extends and the shoulders 43 engage the ends of the band. Further inward movement of the nuts causes the band to tighten about the body 11 with the thrust member 44 butting against the end of the body. After the truck has been applied, the motor may be handled in the customary manner and applied to the transom of the boat. When the motor is to be transported, the same is preferably inverted as shown in Fig. 3 so that the wheels 22 engage the ground. The housing 15 of the motor may then be used as a handle and the motor wheeled around in the manner of a hand truck.

If desired, the axle 21 may be made in one piece as shown in Fig. 4 instead of separate pieces as shown in Figs. 1, 2 and 3. Due to the similarity of the parts of the two forms of the invention, the description of the corresponding parts of the modification shown in Fig. 4 will not be repeated, and the same reference numerals preceded by the digit "1" used to designate the same. In this form of the invention the axle shaft 126 is of greater diameter at its intermediate portion and the extensions 127 thereof which are integral therewith constructed of the same diameter as the extensions 27. In this form of the invention, the threads 124 are cut on the axle shaft 123 and the axle housing 23 dispensed with. The operation of this form of the invention is identical with that described in conjunction with the form of the invention shown in Figs. 1, 2 and 3, except that the wheels 132 must rotate on the shaft extensions 127.

While the band 36 has been shown as directly contacting the body 11, it can be readily comprehended that a gasket or other suitable protecting medium may be inserted between the band and body to protect the paint on the body.

The advantages of the invention are apparent. The truck can be attached to the motor and permanently left there if desired. No alterations of the motor are required and the application to the motor can be easily and quickly accomplished. No marring of the paint of the motor results when the truck is attached thereto. The truck is entirely out of the way when the motor is in use.

Changes in the specific form of the invention, as herein described, may be made within the scope of what is claimed without departing from the spirit of the invention.

Having described the invention, what is claimed as new and desired to be protected by Letters Patent is:

1. In combination with the body of an outboard motor, a band encircling said motor, said band having its ends spaced from one another, openings at the ends of said band, an axle extending through said openings, a thrust member engaging said axle near its center and said body, and means acting between the ends of said band and said axle and drawing the ends of the band together to clamp the band about the body and wheels rotatably supported by said axle.

2. In combination with the body of an outboard motor, a band encircling said motor, said band having its ends spaced from one another, openings at the ends of said band, a tubular axle housing extending through said openings, threads formed on the ends of said axle housing, a thrust member disposed between said axle housing and body, nuts screwed on said threads and engaging said ends of the band and urging the same together to clamp the band on the body, an axle shaft extending through said axle housing, and wheels mounted on said axle shaft and rotatable relative to said body.

3. In combination with the body of an outboard motor, a band encircling said motor, said band having its ends spaced from one another, openings at the ends of said band, a tubular axle housing extending through said openings, threads formed on the ends of said axle housing, a resilient thrust block disposed between said housing and body, nuts screwed on said threads and engaging said ends of the band and urging the same together to clamp the band on the body, an axle shaft extending through said axle housing, and wheels mounted on said axle shaft and rotatable relative to said body.

4. In combination with the body of an outboard motor, a band encircling said motor, said band having its ends spaced from one another, openings at the ends of said band, a tubular axle housing extending through said openings, threads formed on the ends of said axle housing, a resilient thrust block having a bore therethrough and receiving said axle housing and a surface engaging said body, nuts screwed on said threads and engaging said ends of the band and urging the same together to clamp the band on the body, an axle shaft extending through said axle housing, and wheels mounted on said axle shaft and rotatable relative to said body.

5. In combination with the body of an outboard motor, a band encircling said motor, said band having its ends spaced from one another, openings at the ends of said band, an axle extending through said openings, a thrust member engaging said axle near its center and said body, threads on the ends of said axle, nuts screwed on said threads, said nuts having reduced portions extending through the holes in said band and forming shoulders engaging said band to draw the ends of the band toward one another when the nuts are screwed inwardly and wheels mounted for rotation at the ends of said axle.

References Cited in the file of this patent

UNITED STATES PATENTS

| | | |
|---|---|---|
| 706,903 | Crawford | Aug. 12, 1902 |
| 1,479,351 | Winterbottom | Jan. 1, 1924 |
| 2,606,952 | Cofer et al. | Aug. 12, 1952 |
| 2,621,799 | Wilson | Dec. 16, 1952 |
| 2,663,474 | Kelley | Dec. 22, 1953 |

FOREIGN PATENTS

| | | |
|---|---|---|
| 900,377 | France | Oct. 2, 1944 |